(12) United States Patent
Bastide et al.

(10) Patent No.: US 11,461,580 B2
(45) Date of Patent: Oct. 4, 2022

(54) ANCHORING NEW CONCEPTS WITHIN A DISCUSSION COMMUNITY

(71) Applicant: International Business Machines Corporation, Armonk, NY (US)

(72) Inventors: Paul R. Bastide, Ashland, MA (US); Matthew E. Broomhall, Goffstown, NH (US); Liam S. Harpur, Dublin (IE); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 16/674,682

(22) Filed: Nov. 5, 2019

(65) Prior Publication Data

US 2021/0133487 A1    May 6, 2021

(51) Int. Cl.
| | | |
|---|---|---|
| *G06K 9/62* | (2022.01) | |
| *G06F 16/906* | (2019.01) | |
| *G06F 16/901* | (2019.01) | |
| *G06F 40/279* | (2020.01) | |
| *H04L 51/52* | (2022.01) | |

(52) U.S. Cl.
CPC ......... *G06K 9/6218* (2013.01); *G06F 16/906* (2019.01); *G06F 16/9024* (2019.01); *G06F 40/279* (2020.01); *G06K 9/6215* (2013.01); *H04L 51/52* (2022.05)

(58) Field of Classification Search
USPC ................................................ 704/7–10, 257
See application file for complete search history.

(56) References Cited

U.S. PATENT DOCUMENTS

| | | |
|---|---|---|
| 7,188,079 B2 | 3/2007 | Arnett et al. |
| 8,135,848 B2 | 3/2012 | Ramaswamy |
| 8,504,545 B2 | 8/2013 | Kalaboukis |
| 9,426,298 B2 | 8/2016 | Odinak |

(Continued)

OTHER PUBLICATIONS

"Gnip APIs—Documentation to help you integrate Gnip's APIs into your product", GNIP, Copyright 2019, 5 pps., <https://support.gnip.com/apis/>.

(Continued)

*Primary Examiner* — Leonard Saint Cyr
(74) *Attorney, Agent, or Firm* — David K. Mattheis; Maeve M. Carpenter

(57) ABSTRACT

One or more processors access a plurality of messages from a discussion community and determine concept topics and metadata of the messages. A graph of the concept topics and messages is generated with messages and concept topics as nodes and connection strength between nodes as edges. Distances between nodes correspond to computed weights of edges. A low boundary distance threshold is calculated based on the aggregate distances between existing messages and concept topics of the graph. A distance is computed between new concept topics of a received message and existing messages and concept topics. A distance between the new concept topics of the received message and existing nodes is determined and compared to the boundary distance threshold of the graph, and responsive to determined distance falling below the boundary threshold, an action is performed to anchor the new concept topics of the received message in the discussion community.

20 Claims, 4 Drawing Sheets

(56) References Cited

U.S. PATENT DOCUMENTS

| | | | |
|---|---|---|---|
| 9,665,558 B2 | 5/2017 | Bastide et al. | |
| 10,291,570 B2 | 5/2019 | Lavin | |
| 2010/0205126 A1* | 8/2010 | Andersen | G06F 17/10 706/13 |
| 2012/0331049 A1* | 12/2012 | Deeter | G06Q 50/01 709/204 |
| 2012/0331063 A1* | 12/2012 | Rajaram | G06Q 50/01 709/204 |
| 2012/0331064 A1* | 12/2012 | Deeter | G06Q 50/01 709/204 |
| 2013/0054708 A1* | 2/2013 | Bhatt | G06Q 10/107 709/206 |
| 2013/0124447 A1 | 5/2013 | Badros et al. | |
| 2014/0189530 A1* | 7/2014 | Anand | G06Q 30/02 715/753 |
| 2016/0179965 A1* | 6/2016 | Bhatia | G06F 16/9535 707/749 |
| 2017/0351385 A1 | 12/2017 | Ertmann et al. | |
| 2018/0019966 A1* | 1/2018 | Penov | H04L 51/32 |
| 2018/0192094 A1* | 7/2018 | Barnett | H04N 21/4725 |
| 2018/0270186 A1 | 9/2018 | Gibbs et al. | |
| 2018/0287982 A1 | 10/2018 | Draeger et al. | |
| 2019/0007228 A1 | 1/2019 | Vuskovic et al. | |
| 2019/0087467 A1 | 3/2019 | Byrne et al. | |

OTHER PUBLICATIONS

"Natural Language Classifier", IBM, Watson, 11 pps., printed from the Internet on Jul. 31, 2019, <https://www.ibm.com/watson/services/natural-language-classifier/>.

"Page Feed", facebook for developers, Copyright 2019, 3 pps., <https://developers.facebook.com/docs/graph-api/reference/v3.2/page/feed>.

"Social Media Capture, Archiving and Compliance Solutions", SMARSH, Copyright 2019, 11 pps., <https://www.actiance.com/solutions/social-media-compliance/>.

"User", facebook for developers, Copyright 2019, 3 pps., <https://developers.facebook.com/docs/graph-api/reference/user>.

Feng et al., "Competing for Attention in Social Media Under Information Overload Conditions", Oct. 14, 2014, 11 pps., <https://arxiv.org/abs/1410.1668>.

Domeniconi et al., "A Novel Method for Unsupervised and Supervised Conversational Message Thread Detection", In Proceedings of the 5th International Conference on Data Management and Applications, Data 2016, pp. 43-54.

He et al., "Interaction—Aware Topic Model for Microblog Conversations Through Network Embedding and User Attention", Proceedings of the 27th International Conference on Computational Linguistics, pp. 1398-1409, Aug. 20-26, 2018.

Konstan et al., "GroupLens: Applying Collaborative Filtering to Usenet News", Communications of the ACM, vol. 10 Issue 3, Mar. 1997, pp. 77-87, <https://www.researchgate.net/publication/2314792_GroupLens_Applying_collaborative_filtenng_to_Usenet_news/link/0fcfd50db339b0bb54000000/download>.

Rowe et al., "The Semantic Evolution of Online Communities", ACM, 6 pps., printed from the Internet on Oct. 31, 2019, <markusstrohmaier.info › documents › 2014_www2014_semantic_evolution>.

Vander Wal, "Personal InfoCloud", Sep. 27, 2018, 5 Core Insights for Community Platforms Today, 12 pps., <https://www.personalinfocloud.com/blog/2018/9/27/core-insights-for-community-platforms-today>.

* cited by examiner

ANCHORING NEW CONCEPTS WITHIN A DISCUSSION COMMUNITY

FIELD OF THE INVENTION

The present invention relates generally to the field of online social networks and discussion communities, and more particularly to anchoring of new concepts introduced within a community discussion.

BACKGROUND OF THE INVENTION

Online discussion forums and communities are as diverse as they are numerous. Forums and communities are often labeled to indicate a particular topic area, and participating members of the community submit (post) messages assumed to be relevant to the topic of the community. Participants or community members may be authors of messages, responders that confirm or acknowledge messages, but add little additional content, commenters that offer conversational replies to messages, and viewers that view messages, acknowledgements and comments.

Richness of content can be enhanced by authoring, responding, and commenting on concept topics that align with topic areas of the community. As duration of conversation grows, concept topics are initially rooted as a concept in the community and may be anchored as a well-established strong topic by connection with other community concept topics from other messages authored by a plurality of community members.

New messages may be interjected into the community discussion and may include a new concept. Such interjections may be in a question format, a factual point or description, or may be opinion and may be viewed and receive little or no response. As a result, the new concept may lack adequate attention within the discussion community as established concept topic discussions proliferate and continue to develop.

SUMMARY

Embodiments of the present invention disclose a method, computer program product, and system. The embodiments provide a method for anchoring a concept topic of a message submitted to a discussion community, the method provides for one or more processors to determine concept topics of respective messages of the plurality of messages. The one or more processors generate a graph of the concept topics of the respective messages of the plurality of messages of the discussion community including the respective messages and concept topics as nodes of the graph and edges indicating a related connection of the nodes. The one or more processors determine a distance between one or more new concept topics of a new message that is received, and existing messages and concept topics represented by the nodes of the graph. The one or more processors determine whether a first distance between the one or more new concept topics of the new message and existing nodes of the graph meets a pre-determined distance threshold of the graph, and responsive to determining the first distance meets the pre-determined distance threshold of the graph, the one or more processors perform an action to anchor the one or more new concept topics of the new message in the discussion community.

DETAILED DESCRIPTION

Figure 1:
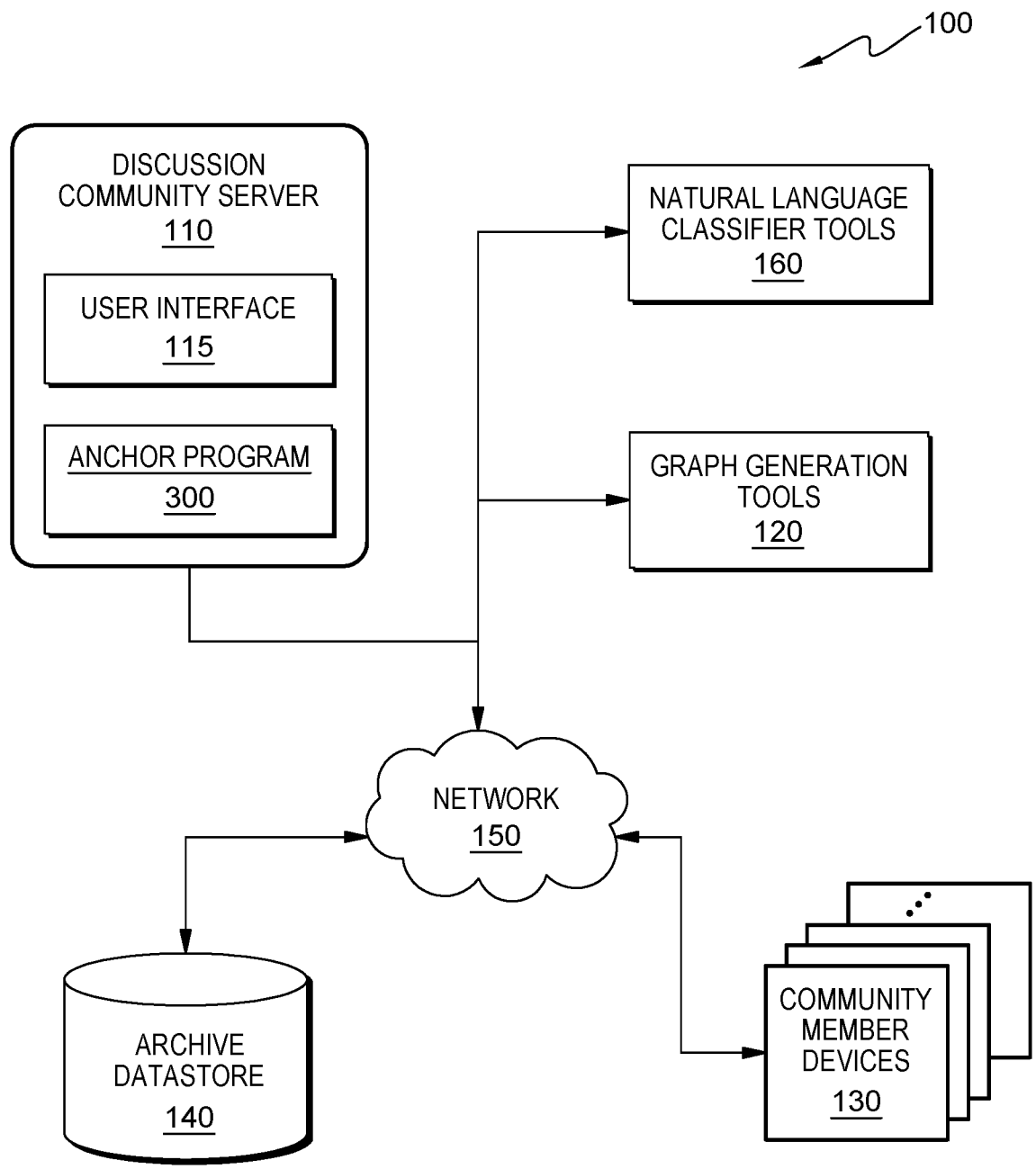
FIG. 1 is a functional block diagram illustrating a distributed data processing environment, in accordance with an embodiment of the present invention.

Embodiments of the present invention recognize that new concepts introduced in established discussion forums or communities often fail to attract engagement of discussion to develop and anchor the concept within the discussion community, and often become ignored or lost. A new concept contributed by a discussion-participating user "jumping in" to a discussion community lacks the feel and atmosphere of the core concepts of the community developed over time. Embodiments recognize that evolving concepts need to be specially treated such that the conversation is supported and moved to a more mainstream conversation by the community.

Embodiments of the present invention also recognize that few communities include processes or tools supporting cultivation of new concepts. Embodiments further recognize that there are too many communication channels, message topics, and contributors to manually monitor and identify new concept topics and provide the appropriate grounding for growth of a conversation within a target community. Anchoring new concept topics enables a participating group of individuals to grow as the concept topics and interconnections increase.

Embodiments of the present invention provide a method, computer program product, and computer system for anchoring a new concept topic of a message submitted to a discussion forum or community (hereafter referred to as a "discussion community"), in which the new concept topic differs from existing discussion topics of the community. Embodiments provide rooting of a concept topic or set of concept topics and initiate actions alerting or influencing community members that may provide extra detail and data to support the concept topics, and not obviate the concept. Embodiments manage a new message or new concept topic input to a discussion community until the new concept is anchored. Properly anchored messages and concept topics of the discussion community include the formation of connection distances to other existing messages and concept topics above a boundary metric of connection by initiating actions to anchor the new message and concept topics.

Embodiments include generating a concept graph by extracting concept topics from accumulated messages of the discussion community and determining relationships between concept topics, topic entities, topic metadata, and conversation participants contributing to concept topic discussions. Concept topic metadata may include, but is not limited to message identification, conversation identification, timestamp, concept topics/categories, author of message, ongoing/terminal status, weighting metrics (views, participation, comments, reads), body and subject of message, 'directed-to' identifiers. Profile information including likes, dislikes, and preferences of participating members of the discussion community are extracted from social media profile sources with user consent. Extracted data are archived in a designated analytical datastore and continually updated as new content is added to and extracted from the discussion community.

In some embodiments of the present invention, a push method is used to extract information from the discussion community. Embodiments identify messages based on conversation identification and timestamp of the message and may make use of software tools to pull data for analysis. The extraction of messages and information may include streaming of messages or batches of messages sent on a pre-determined periodic basis. In some embodiments, the content and participant information of the discussion community is pulled, often based on messages occurring forward of a designated point in time. In other embodiments, a user interface extension is used to capture the data as it is rendered to a display screen and the data is scraped for concept topics and elements of the discussion and participation.

In some embodiments, the extracted information is processed by application software parsing the message into concept topics, entities, and participating community members to generate a graph in which nodes of the graph represent a message, a concept topic of the message) a participating user (i.e., message author, responder, commenter, viewer), and subtypes of messages based on time. Nodes of the graph are assigned edges linking together related or connected data that are represented as nodes. For example, extracted information from a discussion community, and participation and profile information of users of the distribution community are loaded into Apache HBase™ with Apache Spark™ and Apache Hive™ software (Apache HBase, Hive, Spark, and GraphX are trademarks of the Apache Software Foundation in the U.S. and other countries world-wide) to organize the content entries and authors of entries for the community and generate a connection graph of the discussion community content and contribution elements.

In some embodiments of the present invention, the edges of the graph include weights that indicate a strength of relationship between nodes of the graph, such that certain values indicate a stronger relationship while other values indicate a weaker relationship, and an absence of an edge between nodes indicates no determined relationship. The graph represents the connection and relationship of messages, concept topics and their entities of messages, and participating members of the discussion community. The strength or weakness of relationships within the graph, represented as edge values, are described as "distances" between nodes of the graph. In some embodiments, highly connected/related nodes have near (i.e., smaller) distances, whereas slightly related nodes have far (i.e., larger) distances between concept topics. In other embodiments, metrics may be used to represent connected/related nodes inversely in which highly connected nodes have larger associated values (distances).

In some embodiments, distances between nodes may be determined based on, for example: a count of concept topics within a message connected to another message; a series of messages; a frequency of a concept topic within a message count range or within a designated time range; co-occurrence of participants authoring and responding to messages; and metadata associated with messages and participants. Distance determination may include a total of connections of concept topics of a message to another message. In some embodiments, distance can be a weighted function indicating how far away a particular concept topic connection is from another concept topic, and may include consideration of concept topic term frequency, the sum of messages associated with co-mention of the concept topics, participants contributing to both topics, and common profile attributes of users participating in discussion of either or both concept topics.

In some embodiments, respective message concept topics are selected and the connectivity of the concept topics to other messages and concept topics within the discussion community is determined, as measured by distance between nodes of the community's graphs. In some embodiments, an average "concept-topic-to-message" distance is determined, and a minimum connection coverage is established. In some embodiments, a less-than-average, less-than-median, or outside standard deviation threshold is determined for a concept topic connection to the discussion community. In some embodiments, mean (average), median or mode of the distances between nodes of the discussion community's graph is used to determine a central tendency of the distances between nodes of the graph. In some embodiments, an offset of the central tendency measure is used to set a pre-determined boundary distance threshold, such that a node having connectivity distance that does not meet the boundary distance threshold triggers action to facilitate anchoring the concept topic associated with the node within the discussion community.

Embodiments presented herein consider meeting the pre-determined distance threshold as attaining a sustaining level of connectivity to other concept topics of the discussion community, and not triggering actions to anchor the new message concept topics. Accordingly, connectivity distance between the closest affinity of existing nodes of the discussion community graph and a nodes of concept topics of a new message submitted to the discussion community that fails to meet the pre-determined threshold, triggers actions to facilitate anchoring the concept topic associated with the node within the discussion community.

In some embodiments of the present invention, attributes of a peer community of interest are used to configure a target community and set features of a schema of organizing information associated with the target discussion community. The peer community may serve as a model to follow in computing distances labeling edges between nodes of the discussion community's graph. Attributes of the peer community used to determine distances between nodes may include targets for frequency of a concept target, associated sentiment, velocity of participation of users, inter-relationship of users, and optimal thresholds. In some embodiments of the present invention, a discussion community may include textual messages shared among all members of the community. In other embodiments, the discussion community may include interactive audio transmissions among community members, and in yet other embodiments, a combination of textual messages and audio messages may be included as content of the discussion community.

Embodiments of the present invention analyze distances determined between concept topics of a new message and nodes of the discussion community graph and determine whether the closest affinity node to the new message concept topics fails to meet a distance threshold. The new message concept topics with a distance that fails to meet the threshold is managed until the new concepts are successfully anchored and the new concept connections to community graph nodes are meet the connectivity distance thresholds and include active community discussion activity.

In some embodiments, management of the new message concepts includes suggesting the new message author obtain and provide additional content to further elaborate and develop the new message until a concept connection is established that further links the new message in the community. In some embodiments, management of the rooted new message includes suggesting the new message be pinned to be at the top of the message board until a well-developed concept connection results and the message concept is anchored with connections from previous concepts discussed in the community. In other embodiments, anchoring of the new message includes actions of adding individuals to the community who are able to add context detail and data to support the concept topics.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes discussion community server 110, graph generation tools 120, community member devices 130, and archive datastore 140, all connected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between discussion community server 110, graph generation tools 120, community member devices 130 and archive datastore 140, in accordance with embodiments of the present invention.

Discussion community server 110 is a discussion community server that includes user interface 115 and anchor program 300. Discussion community server 110 can be a standalone computing device, a smart phone, a tablet computer, a laptop computer, or any other electronic device or computing system capable of receiving, sending, and processing data. In other embodiments, discussion community server 110 can represent a computing device interacting with applications and services hosted and operating in a cloud computing environment. In another embodiment, discussion community server 110 can be a netbook computer, a desktop computer, a personal digital assistant (PDA), or other programmable electronic device capable of communicating with graph generation tools 120, community member devices 130, archive datastore 140, and other computing devices (not shown) within distributed data processing environment 100 via network 150. In another embodiment, discussion community server 110 represents a computing system utilizing clustered computers and components (e.g., database server computers, application server computers, etc.) that act as a single pool of seamless resources when accessed within distributed data processing environment 100. Discussion community server 110 may include internal and external hardware components, depicted in FIG. 4.

User interface 115 provides users of discussion community server 110 an interface to access features and functions of discussion community server 110. In some embodiments of the present invention, user interface 115 provides access to anchor program 300. User interface 115 also supports access to other applications, features, and functions of discussion community server 110. User interface 115 supports access to alerts, notifications, and other forms of communications. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of discussion community server 110. User interface 115 enables a user of discussion community server 110 to receive, view/hear, and respond to input, access applications, and perform functions available on discussion community server 110.

Anchoring program 300 identifies new message concepts within a discussion community, roots the concepts in the community discussions and manages the new concepts until the new concepts are anchored within the discussion community. Rooting of the new message includes positioning the concepts within a targeted community and maintaining the new message and concept topics within the discussion community while actions are performed to facilitate anchoring the new concept within the discussion community. Anchoring of the new message concept topics includes establishing connections between the new concept topics and other concept topics of existing messages as represented in the graph of connectivity of the discussion community, and identifying conversation messages and participants within the community directed to the new concept topics that elevate the new message concept topics to at least meet the threshold distance to another concept topic of the discussion community.

Anchoring program 300 accesses the existing content of a discussion community and the information associated with the members of the discussion community that author, respond, comment, view, and interact with social modalities, such as likes, stars, and "thumbs-up/down" sentiment indicators. Further, anchoring program 300 can load content and information to natural language classifier tools 160 to generate and identify concepts associated with messages and information associated with authoring and viewing members, with each message identified by metadata associated with posting of the message and each concept linked to the source message. Anchoring program 300 parses the content of the discussion community and metadata information associated with the messages and participating members, extracting concept topics from the messages of the discussion community and information associated with members of the community that connects members to their respective message activity within the community as well as consented access to member profile attributes.

The output of the natural language classifier proceeds as input to a set of graph-generating tools, represented in FIG. 1 as graph generating tools 120. Anchoring program 300 receives from graph generating tools 120 a graph in which messages of the discussion community are nodes, and edges between messages connect related messages. In some embodiments the messages include one or more concepts, also referred herein as concept topics, which include discussion content having relevance and connection to other discussion entries previously posted in the discussion community.

In some embodiments of the present invention, anchoring program 300 assigns weights to the edges connecting nodes of the graph and the weights indicate a strength of relationship between the nodes that correspond to messages and concept topics of messages. In some embodiments, anchoring program 300 determines edge weights by the evidence of connection between nodes, which may include a sum of concept mentions within messages and/or the count of messages associated with the concept topic. In some embodiments, co-occurrence of concept topics within two or more messages results in higher weights assigned to edges connecting the messages and co-occurring concept topics. Greater evidence receives higher edge value weights, indicating a stronger relationship, whereas lower weights are given to edges that include lower levels of evidence relating nodes. In some embodiments, relationships between messages and/or concept topics are referred to as a "distance" between nodes of the graph, with a stronger relationship corresponding to a shorter distance between nodes and a weaker relationship corresponding to a greater distance between nodes. In some embodiments a greater weight to an edge between nodes of a graph may correspond to a closer "distance" between the nodes.

In some embodiments, anchoring program 300 determines an average concept connection and a standard deviation for a level of relationship between two message concept topics of the discussion community. Using the determined average weighted value of connection in the community and factors (0.5, 1.0, 1.5, 2.0 . . . ) applied to the standard deviation, anchoring program 300 establishes a low boundary of concept connection as compared to the average weighted connection of the discussion community. In response to determining a new message concept topic remains below the low boundary of connection for the discussion community, anchoring program 300 triggers actions to facilitate anchoring of the new concept topic posted in the discussion community.

For example, anchoring program 300 may take one or a combination of the following actions to facilitate anchoring of the new concept into the discussion community:

a. suggesting, to the author of the new concept, more elaboration and detail regarding the new concept;

b. identifying a link to an existing concept topic of the discussion community; present sentiment relative to the new message and concept topic;

c. identify a categorization of the new message and request confirmation or correction of the classification of the new message and concept topic by the authoring user;

d. recommend pinning the new concept topic in the discussion community to promote acknowledgement of the new message and concept topic;

e. identify linkages to community members through keyword and use @mention.

In some embodiments of the present invention, anchoring program 300 applies a hierarchical approach to applying actions to facilitate anchoring of a new concept topic of a message, triggering additional actions subsequent to detecting little or no conversational activity by community members. For messages that make little progress towards anchoring subsequent to actions taken, anchoring program 300 may elevate the concept topic to a higher categorical level and re-assess the messages and participating community members active at the higher categorical level, bringing the new concept topic to the identified members' attention. In some embodiments, anchoring program 300 assigns the new concept topic to a default topic category associated with introduced new concept topics, such as a category of "newbie topics" or similar categorization and may re-position the concept topic subsequent to adequate conversation and member activity indicates anchoring of the new message concept within the discussion community.

In some embodiments of the present invention, anchoring program 300 receives input of settings, structure, and procedure modeled after a peer discussion community that exhibits desired structure and behavior, referred to as a role model community. Having identified the role model community, aspects are copied or duplicated and applied to the target discussion community, and embodiments of the present invention operate to develop and improve the target discussion community over time. Anchoring program 300 may receive manual input from copied aspects of the role model community and may include approaches to determining and assigning edge weights, as well as decisions regarding the granularity of concept topics.

In some embodiments, anchoring program 300 operates assuming that new message concept topics are intended and belong as pare of the target discussion community and assumes that other services are available and applied to discussion community server 110 to address and block or remove, inappropriate and improper message contributions to the discussion community. New concept messages that experience little or no activity, remaining below a low boundary of weighted connection to other messages and concept topics, may be processed through natural language classifier tools 160 to extract and determine categories, concept topics, and attributes and participation information of the author of the new concept topic.

Graph generation tools 120 includes a set of software that receives the message content of the discussion community parsed and extracted by natural language classifier tools 160, and generates a graph based on the messages that include an identification code, concept topics of the messages, and information associated with participants of the messages. Graph generation tools 120 forms nodes corresponding to messages of the discussion community content, and concept topics that correspond to the respective messages. Graph generation tools 120 represents community members associated with authored, commented, and viewed messages and concept topics. Graph generation tools 120 connects related messages and concept topics with edges and indicates a strength of the connection relationship between nodes of the graph by assigning a weight to the edges.

In some embodiments, nodes separated without edge connections represent messages and/or concept topics that have no evidence of relationship, whereas nodes that have strong evidence of relationship, based on multiple occurrences or co-occurrences of concept topic mentions, and reinforcement by multiple member views, comments and response, may show a high weighted value associated with an edge connecting the nodes. As new concept topics are supported with increased discussion conversations and connections with other concept topics (nodes) raising the connection value of the new concept topic above the low boundary level for the discussion community, anchoring program 300 determines the topic anchored within the discussion community and may cease facilitating actions.

Community member devices 130 represents respective computing devices of multiple members of the target discussion community. Community member devices 130 connect to the target discussion community via discussion community server 110. Users of community member devices 130 author messages, view messages, comment on messages or indicate social modalities associated with messages included in the discussion community. One or more community members operating respective community member devices 130 may contribute a new message that includes one or more new concept topics to the discussion community.

Figure 2A:
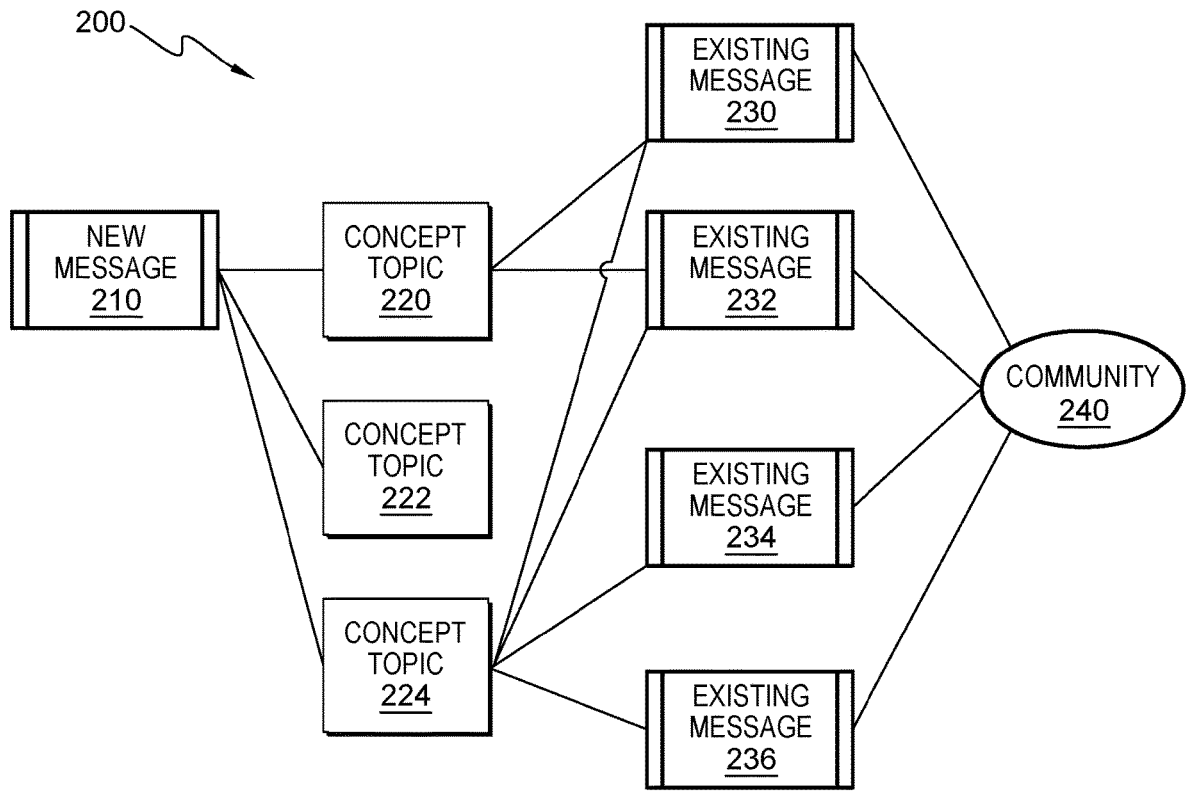
FIG. 2A is a block diagram depicting a portion of an example graph of a discussion community, in accordance with an embodiment of the present invention.

Archive datastore 140 is a repository of content generated within the discussion community and processed through natural language classifier tools 160. In some embodiments of the present invention, messages added to the discussion community by members operating community member devices 130 are stored in archive datastore 140. In some embodiments, tools may be used to push message content, such as streaming-based processes, from the discussion community operating on discussion community server 110 to archive datastore 140, while in other embodiments archive datastore 140 pulls content from the discussion community based on accessing feeds or an API of the discussion application. In yet other embodiments, archive datastore 140 receives message content and information from user interface extensions that capture data on the respective screens of community member devices 130 and transmits the content to archive datastore 140. In some embodiments, the data is loaded into a table based on a schema that includes, but is not limited to: Message body, subject, metadata; concept topics; unique message identifier; conversation identifier; access control; owner; location; tenant; terminal; weights; community identifier;

FIG. 2A is a block diagram depicting a portion of an example graph 200 of a discussion community, in accordance with an embodiment of the present invention. FIG. 2A includes new message 210, concept topics 220, 222, and 224, existing messages 230, 232, 234, and 236, and community 240. Community 240 includes messages previously posted to the discussion community by members of community 240, for example, existing messages 230, 232, 234, and 236. New message 210 is generated by one of community member devices 130 (FIG. 1) and is added to the content of discussion within community 240 and is processed through natural language classifier tools 160 and processed by graph generating tools 120. Processing of new message 210 results in identifying concept topics 220, 222, and 224, shown with connection edges to new message 210.

Concept topic 220 is determined to have connection or relevance to existing message 230 and existing message 232. For example, concept topic 220 may include discussion of electronic components, and discussion within existing message 230 may mention a specific component determined to be an electronic component. The co-occurrence of the concept topic "electronic components" establishes a relevant connection between concept topic 220 and existing message 230. Existing message 232 may include content mentioning replacement of an electronic component and establishes a relevant connection between concept topic 220 and existing message 232.

New message 210 also includes concept topic 224 which is depicted as having edge connections to existing messages 230, 232, 234, and 236, indicating concept topic 224 shares relevance to concept topics of the identified existing messages. For example, concept topic 224 may include discussion of repair of electronics. Each of existing messages 230, 232, 234, and 236 may also discuss electronic repairs, in connections with particular component replacement, discussion of component failure, or techniques applied for electronic repair. Concept topic 224 illustrates connection to four existing messages, concept topic 220 is shown with connection to two existing messages, and concept topic 222 is shown with no connections to existing messages.

In some embodiments of the present invention, the sum of connections and co-occurrences of concept topics in messages results in graph node connections that are stronger than counterparts with fewer node connections and fewer co-occurrence of concept topics in messages. Graph edges indicating connection and relevance between graph nodes may receive weight values that indicate a strength of connection between nodes often referred to as distances between nodes. For example, based on a summation of connecting edges between messages, an edge directly connecting new message 210 and existing messages 230 and 232 (not shown) may have a larger weight value (2) indicating a than the edges connecting new message 210 to existing messages 234 and 236 (1). In some embodiments, a greater weight value indicates inversely a closer distance between nodes, and a lower weight value indicates a greater distance between nodes.

Concept topic 222 of new message 210 is shown with no connecting edges to existing messages of community 240. Concept topic 222 is a new concept topic introduced to the discussion community. In some embodiments of the present invention, anchoring program 300 determines that concept topic 222 fails to meet the boundary distance threshold of concept connection for the community, and triggers actions to facilitate anchoring of concept topic 222 in the community discussions. For example, anchoring program 300 may pin concept topic 222 to the top of the community discussion to insure acknowledgement of members accessing the community and promote viewing and response to concept topic 222. In another example, anchoring program 300 may provide suggestions to the author of concept topic 222 to add additional details or develop concept topic 222 further. Anchoring program 300 may continue to manage concept topic 222 by initiating actions to facilitate discussion conversation among members of community 240 until concept topic 222 has received connections resulting in edge values to graph nodes of community 240 that meets the boundary distance threshold of connection.

Figure 2B:
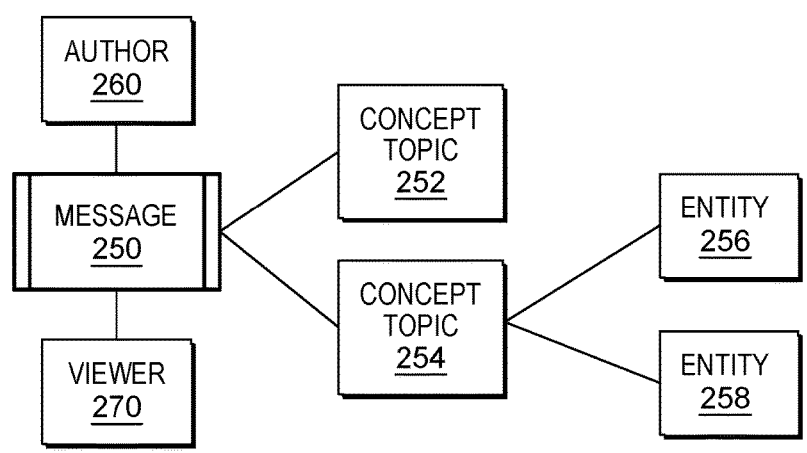
FIG. 2B is a block diagram depicting connections of message components of a discussion community graph, in accordance with an embodiment of the present invention.

FIG. 2B is a block diagram depicting connections of message components of a discussion community graph, in accordance with an embodiment of the present invention. FIG. 2B includes message 250, concept topic 252 and concept topic 254, entity 256 and 258, author 260 and viewer 270. FIG. 2B illustrates a graph connection example of message, concept topic, entity and community member connections to messages. Message 250 is composed and submitted to the discussion community by author 260, and subsequently viewed by viewer 270. In some embodiments of the present invention, the message includes a message identifier and timestamp uniquely identifying the message and the community to which the message is submitted as metadata. The message metadata may also include, but are not limited to: author, viewer, commenter, tenant, message state, modality marks, and consented profile information of participating members of the community. A tenant provides the platform for the discussion community, operation of anchoring program 300 and access and use of supporting tools. A message state may indicate whether a message is an initial contribution of a concept topic or entity, a response within an ongoing conversation of a concept topic, or a terminal message to the conversation.

Concept topics 252 and 254 are extracted from message 250 and represent a respective category of discussion in the message. For example, message 250 includes the content: "The weather forecast is calling for unseasonably cold conditions that will last for a few days, with the possibility of rain. This may affect the activities that are planned. We may have to change the activities." Concept topic 252 may be "activities", whereas concept topic 254 may be "weather" with entity 256 being "cold conditions" and entity 258 being "rain." Author 260 and viewer 270 are shown with connection edges to message 250 and provide identification and consented information of the participating discussion community members. Embodiments of the present invention establish connection between messages, concept topics, entities, and participating members by edges connecting nodes within the graph of the discussion community.

Figure 3:
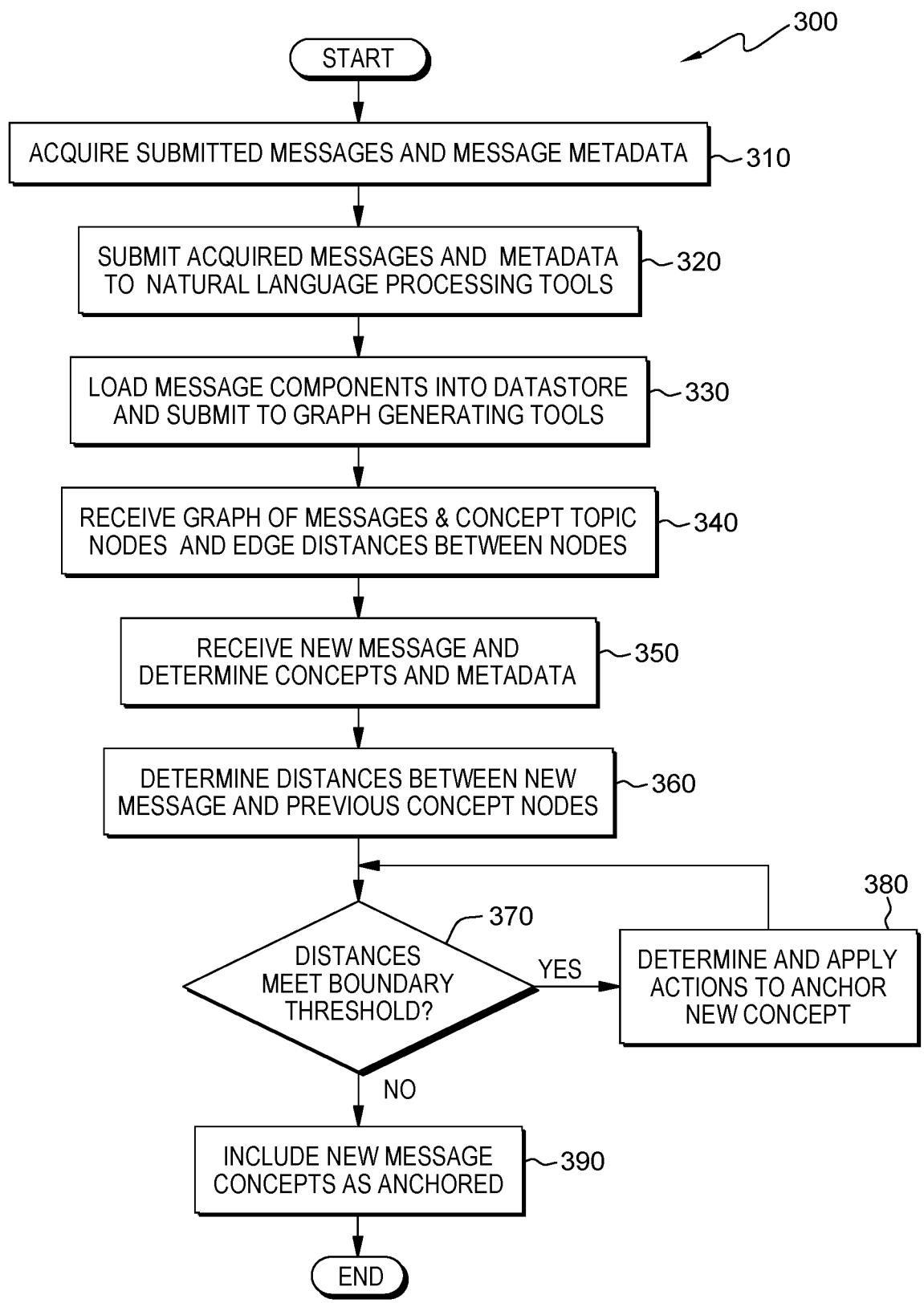
FIG. 3 is a flowchart illustrating the operational steps of a anchoring program operating within the distributed data processing environment of FIG. 1, in accordance with an embodiment of the present invention.

FIG. 3 is a flowchart illustrating the operational steps of anchoring program 300 operating within the distributed data processing environment of FIG. 1, in accordance with an embodiment of the present invention. Anchoring program 300 utilizes tools to extract concept topics and entities from discussion messages, such as using natural language classifier tools 160 (FIG. 1). Anchoring program 300 transmits the extracted concept topics, entities, participant, and metadata information to a tool set to generate a graph indicating connection between nodes that represent messages, concept topics, entities and participating members of the discussion community.

In various embodiments, the generated graph includes edges connecting nodes of the graph, and indicating the strength of connection (relevance, relationship) between nodes by a distance metric between nodes. In some embodiments of the present invention, anchoring program 300 determines the edge distances by assigning weights to an edge connecting nodes of the graphs. As with many graph techniques that depend on nodes and edges, in some embodiments, the nodes and edges may be transposed such that nodes become edges, and edges become nodes. In embodiments of the present invention, anchoring program 300 receives a new message and concept topic, roots the message and concept topic within the discussion community, and manages the concept topic, taking actions until the concept topic is anchored within the discussion community.

Anchoring program 300 acquires submitted messages and message metadata from the discussion community (step 310). In some embodiments, anchoring program 300 accesses the discussion community datastore and sends content of the discussion community to a natural language classifier tool set. Anchoring program 300 includes acquiring metadata associated with the individual messages comprising the content of the discussion community. In some embodiments, anchoring program 300 retrieves content from a pre-established mark within the datastore, marked from previous retrievals. In some embodiments, the discussion community platform includes function to push the content of the discussion community to anchoring program 300 to forward to natural language processing.

For example, anchoring program 300 acquires content from the discussion community for the previous 24 hours, which marks the point of the previous retrieval. The content acquired by anchoring program includes content of all new messages and message conversation strings submitted within the previous 24 hours, and metadata associated with the messages, which identifies the message uniquely, as well as the author. Anchoring program 300 receives the content pushed from archive datastore 140 and forwards the content for natural language processing.

Anchoring program 300 submits acquired messages and metadata to natural language processing tools (step 320). The content of the discussion community submitted to the natural language tools, such as a natural language classifier, extracts concept topics and entities from the messages, and identifies community members associated with the message. The natural language tools identify metadata associated with the message, including unique identification of the message, the target community, timestamp of the message, author, viewers, comments and social modality, as well as other metadata items. For example, anchoring program 300 analyzes the discussion community content submitted by anchoring program 300 and extracts the concept topics associated with each message, as well as entities of the concept topics. The metadata of the message is identified and included with message classifier results.

Anchoring program 300 loads message components into a datastore and submits the message components to graph generating tools (step 330). Anchoring program 300 receives the results extracted from the discussion community content received from the natural language classifier tools and loads the resulting data into a datastore, for example loading the data into Apache HBase and Hive and following a pre-determined schema. In some embodiments the schema follows a column-oriented table structure and may include a secondary table containing community member information associated with respective messages, and otherwise consented-to by the respective member. Anchoring program 300 sends the structured output from the natural language classifier tools to a graph generating tool set. For example, Apache Spark and Spark GraphX (Apache HBase, Hive, Spark Spark GraphX are registered trademarks of the Apache Software Foundation in the United States and other countries world-wide).

Anchoring program 300 receives a graph of messages and concept topics of the discussion community (step 340). The received graph includes nodes representing messages, concept topics and may also include nodes identifying authors, viewers, as well as comments and social modalities (e.g., likes, thumbs-up/down, stars, shares, etc.). In some embodiments, the graph may include identification of entities associated with a concept topic of the message. The graph represents relationship among the nodes by connecting nodes with edges of the graph. In some embodiments, the messages may have edges connecting concept topics, authors, viewers, and other messages and concept topics. In some embodiments, entities may connect with concept topics, messages, and community members. In general, connections link community-to message-to concept topics (and in some cases entities) and determine a count of messages connected to the concept topic.

Receipt of the graph of messages of the discussion community includes distances corresponding to the strength of connection (i.e., relationship, relevance) between nodes of the graph. In some embodiments, the distances are based on weights determined by summing a count of connections to a message and/or concept topic. In some embodiments, the weight of connection reflecting distance between nodes of the graph are further strengthened by a count of members contributing to the discussion, comments, views and modalities associated with a message.

Having established a graph of the discussion community messages and concept topics, and the distances indicating strength of connection between the messages and concept topics, anchoring program 300 determines a new message concept topic is received and determines the concept topics and metadata of the new message (step 350). Anchoring program 300 processes the new message through the natural language classifier tools and graph generating tools of steps 320 through 340 (discussed above) and is initially rooted in the discussion community. For example, a new message, such as new message 210 (FIG. 2) is received in the discussion community and positioned within the posted discussions. Anchoring program 300 processes the content of the new message through natural language classifier tools 120 and loads the content into a datastore following a pre-determined schema and submitted to graph generating tools 160. Anchoring program 300 receives the output from the graph generating tools 160 indicating nodes and edges connecting to existing messages and concept topics, if any.

Anchoring program 300 determines the distance between the new message concept topics and existing messages (step 360). The nodes of the discussion community graph are connected by edges indicating a relationship or relevance between concept topics of a message to other messages. In some embodiments of the present invention, the connectivity of concept topics of a first message to one or more concept topics of second message is summed and used to compute weights for edges between messages. In some embodiments, additional factors may add to weight computations, considering the connection of members to messages and concept topics as authors, viewers, or indicating comments or modalities.

Embodiments of the present invention compute an average concept topic connection to messages and determine statistical ranges from the average, such as a standard deviation. In some embodiments, the boundary of connection, based on the discussion community graph and computed edge weights, is determined by selecting one or more standard deviations from the computed average concept topic connection to messages. In other embodiments, the boundary of connection for the graph of the discussion community is determined by other statistical or logical means based on the average, median, or mode of connection.

For example, message 1 (MSG1) and message 2 (MSG2) each have one edge connecting to concept 3, resulting in a fan in value of 2. If the average edge value is significantly higher than 2, the weight (distance) assigned to the edge between MSG1 and MSG2 indicates low relevance or low relationship, which would correspond to a low weight assigned to the edge (or greater distance between nodes). Concept topic connection paths are used for weight (distance) determination as concept topics are a descriptive association of the message.

In another example, a first message includes discussion of the concept topic of hot dogs. Additional categorical concepts discussed include baseball, barbeque grill, picnic, and lunch. The higher category association may be food. The concept topic of hot dogs may have multiple linkages to concept topics of messages associated with baseball, barbeque grill, picnic, lunch, and possibly others. In some embodiments of the present invention, edge computation may include following a path of association with the graph and summing the edge paths with an initial connection value of 1, a second-degree connection of $\frac{1}{2}$, a third-degree connection as $\frac{1}{4}$, and so forth. In some embodiments, the graph edge values of the path from the initial concept to the twice removed categorical concept are aggregated as $1-\frac{1}{2}-\frac{1}{4}=\frac{1}{4}$. Weights can be assigned for highly linked direct connections by simply using set link values between concept topics. For example, the value 1 (linked or related connection) or the value 0 (not linked or related connection) or incremental values ($\frac{1}{2}$, $\frac{1}{4}$, ... or 5,4,3,2,1) may be assigned for less direct or partially related concept topics linage within the graph.

Anchoring program 300 determines whether the distances between the new message concept topic and existing messages of the discussion community are outside of the end boundary (decision step 370). In some embodiments, anchoring program 300 compares the connection weights of the new message concept topics to existing messages of the discussion community and determines whether the connection weights fall below the determined boundary of connection for the discussion community graph. For example, concept topic 222 (FIG. 2) is depicted as lacking edge connections to any existing message of community 240. A computed average connection weight or distance of the community messages to concept topics may be 3.2, and have a standard deviation of 1.6, which may define a boundary of connection at 1.6. Without edges connecting concept topic 222 to existing messages, the computed distance would be zero; below the boundary connection of 1.6.

For the case in which anchoring program 300 determines that the distances are above the end boundary (step 370, "NO" branch), anchoring program 300 proceeds to include the new message concept topic(s) as anchored within the discussion community (step 390) and takes no actions to further facilitate anchoring of the new message.

For the case in which anchoring program 300 determines that the distances between the new message concept topic and existing message nodes of the graph fail to meet the boundary threshold (step 370, "YES" branch), anchoring program 300 proceeds to determine and apply actions to anchor the new message concept topics in the discussion community (step 380).

Anchoring program 300 selects and initiates an action to anchor the new message and concept topics of the new message in the discussion community. In some embodiments, anchoring program 300 may employ a hierarchy of actions, initiating a first action and monitoring results and initiating subsequent actions if previous actions fail to generate adequate connections to messages and members of the discussion community. Anchoring program 300 may use actions such as prompting the author to pin the new message and concept topics to the discussion community such that members of the community are prompted with awareness and in some cases, acknowledgement of the new message and concept topics.

In some cases, anchoring program 300 may prompt the author of the new message to provide additional details, explanation, or suggest linkages, in other cases anchoring program 300 may prompt the author to indicate sentiment or offer an author-categorization of the new message concept topics. In some embodiments, anchoring program 300 promotes or @mentions the new concept topics to members of the discussion community or categorizes the new concept topics at a higher level of category, such as genus from species.

Having applied actions to anchor the new message and concept topics in the discussion community (step 380) and determining the distance of the new message and concept topics no longer fall below the boundary of connection (step 370, "NO" branch), and including the new message and concept topics as anchored (step 390), anchoring program 300 ends.

Embodiments of the present invention are discussed with respect to text-based discussion communities for clarity and convenience, which may be online social or technical communities. However, embodiments are not limited to text-based messaging and dialog. Audio discussion and audio/video discussions can similarly be processed to acquire the content and process as previously described.

Figure 4:
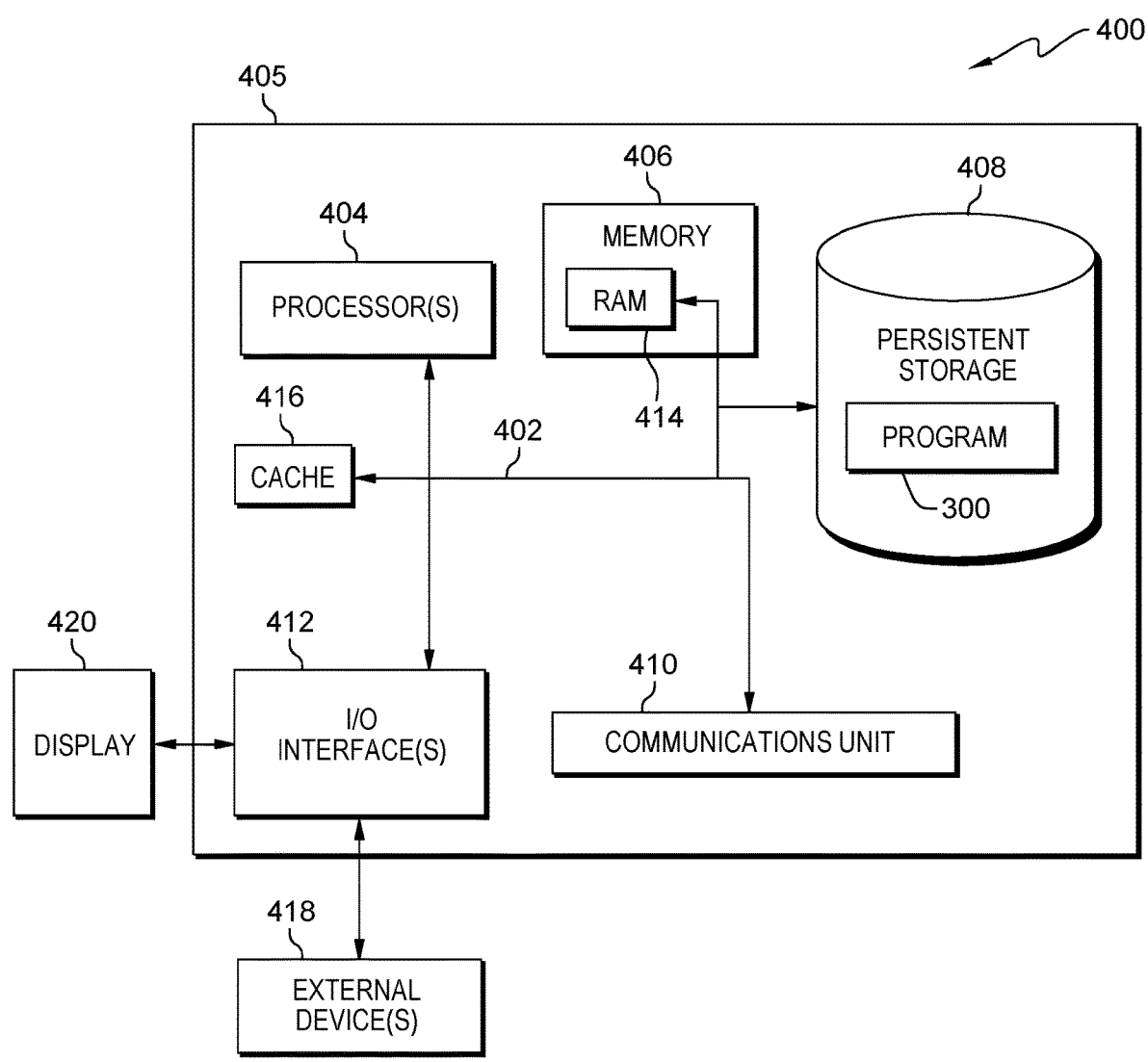
FIG. 4 depicts a block diagram of components of a computing system, including a computing device capable of operationally performing the migration program of FIG. 2 and the verification program of FIG. 3, in accordance with an embodiment of the present invention.

FIG. 4 depicts a block diagram of components of computing system 400, including computing device 405, configured to include or operationally connect to components depicted in FIG. 1, and capable of performing operational steps of anchoring program 300 of FIG. 3, in accordance with an embodiment of the present invention.

Computing device 405 includes components and functional capability similar to discussion community server 110 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

In one embodiment, anchoring program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Anchoring program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., anchoring program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for anchoring a concept topic of a message submitted to a discussion community, the method comprising:
    one or more processors determining concept topics of respective messages of a plurality of messages of a discussion community;
    the one or more processors generating a graph of the concept topics of the respective messages of the plurality of messages of the discussion community, including the concept topics and the respective messages as nodes of the graph, and edges indicating a related connection of the nodes;
    the one or more processors determining a distance between one or more new concept topics of a new message that is received, and existing nodes of the graph representing the messages and concept topics of the plurality of messages;
    the one or more processors determining whether a first distance between the one or more new concept topics of the new message and the existing nodes of the graph fails to meet a pre-determined boundary distance threshold of the graph; and
    responsive to determining the first distance fails to meet the predetermined boundary distance threshold of the graph, the one or more processors performing an action to anchor the one or more new concept topics of the new message in the discussion community.

2. The method of claim 1, further comprising:
    one or more processors computing distances between the nodes of the graph of the discussion community by summing values associated with the edges connecting concept topics of one message to concept topics of another message.

3. The method of claim 1, wherein the pre-determined distance threshold of the graph includes a boundary distance threshold of the graph, based on an offset of a measure of central tendency of distances between nodes of the graph.

4. The method of claim 1, further comprising:
    the one or more processors determining a relevance of concept topics of existing messages based on the distances between nodes of the graph corresponding to the concept topics of the existing messages; and
    the one or more processors determining the distance between two nodes of the graph by assigning a weight to an edge connecting the two nodes of the graph corresponding to the concept topics of two existing messages of the discussion community.

5. The method of claim 1 further comprises metadata of the messages that includes an identification of a respective message, identification of an author of the respective message, identification of the discussion community, a timestamp of the posting of the respective message, and one or a combination selected from a group consisting of: identification of viewers of the respective message, a sentiment associated with the respective message, and one or more social modalities associated with the respective message.

6. The method of claim 1, wherein performing the action to anchor the one or more new concept topics of the new message in the discussion community includes performing a subsequent action of a hierarchy of actions in response to determining the one or more new concept topics of the new message fails to meet the boundary distance threshold following a previous action.

7. The method of claim 1, wherein performing the action to anchor the one or more new concept topics of the new message in the discussion community proceeds until all of a hierarchy of actions have been exhausted, thereafter assigning the one or more new concept topics of the new message to a new category.

8. A computer program product method for anchoring a concept topic of a message submitted to a discussion community, the computer program product comprising:
one or more computer readable storage media and program instructions stored on the one or more computer readable storage media, the program instructions comprising:
program instructions to access a plurality of messages of a discussion community;
program instructions to determining concept topics of respective messages;
program instructions to generate a graph of the concept topics of the respective messages of the plurality of messages of the discussion community including the respective messages and concept topics of the respective messages as nodes and edges indicating a related connection of the nodes;
program instructions to identify a strength of relationship between the concept topics of the plurality of messages by determining a distance between the concept topics of the plurality of messages;
program instructions to compute a boundary distance threshold of the graph, based on the distances determined between the messages and concept topics of the plurality of messages of the discussion community;
program instructions to determine a distance between one or more new concept topics of a new message that is received and existing nodes of the graph representing the messages and concept topics of the plurality of messages;
program instructions to determine whether a first distance between the one or more new concept topics of the new message and the existing nodes of the graph fails to meet the boundary distance threshold of the graph; and
responsive to determining the first distance fails to meet the boundary distance threshold of the graph, program instructions to perform an action to anchor the one or more new concept topics of the new message in the discussion community.

9. The computer program product of claim 8, further comprising:
program instructions to compute distances between nodes of the graph of the discussion community is computed by summing the edges connecting concept topics of one message to concept topics of another message and includes connections between metadata associated with the respective messages of the plurality of messages.

10. The computer program product of claim 8, wherein the boundary distance threshold is based on an offset of a measure of central tendency of distances between nodes of the graph.

11. The computer program product of claim 8, further comprising:
program instructions to determine a relevance of concept topics of existing messages, based on the distances between nodes of the graph corresponding to the concept topics of the existing messages; and
program instructions to determine distances between the nodes by assigning a weight to the edge connecting the nodes of the graph corresponding to the concept topics of the existing messages, indicating a strength of relationship between the nodes.

12. The computer program product of claim 8, wherein metadata of the respective messages of the plurality of messages includes author of the message, viewers of the message, a message identification, a community identification, a timestamp of the message, a sentiment, and one or more social modalities associated with the message.

13. The computer program product of claim 8, wherein performing the action to anchor the one or more new concept topics of the new message in the discussion community includes performing a subsequent action of a hierarchy of actions in response to determining the one or more new concept topics of the new message fails to meet the boundary distance threshold following a previous action.

14. The computer program product of claim 8, wherein performing the action to anchor the one or more new concept topics of the new message in the discussion community proceeds until all of a hierarchy of actions have been exhausted, thereafter assigning the one or more new concept topics of the new message to a new category.

15. A computer system for anchoring a concept topic of a message submitted to a discussion community, the computer system comprising:
one or more computer processors;
one or more computer readable storage media; and
program instructions stored on the one or more computer readable storage media, the program instructions comprising:
program instructions to access a plurality of messages of a discussion community;
program instructions to determining concept topics of respective messages of the plurality of messages;
program instructions to generate a graph of the concept topics of the respective messages of the plurality of messages of the discussion community, including the concept topics and respective messages as nodes, and edges indicating a related connection of the nodes;
program instructions to identify a strength of relationship between the concept topics of the plurality of messages by determining distances between the concept topics of the plurality of messages;
program instructions to compute a boundary distance threshold of the graph, based on the distances determined between the messages and concept topics of the plurality of messages of the discussion community;
program instructions to determine a distance between one or more new concept topics of a new message that is received and existing nodes of the graph representing the messages and concept topics of the plurality of messages;
program instructions to determine whether a first distance between the one or more new concept topics of the new message and the existing nodes of the graph falls below the boundary distance threshold of the graph; and responsive to determining the first distance fails to meet the boundary distance threshold of the graph, program instructions to perform an action to anchor the one or more new concept topics of the new message in the discussion community.

16. The computer system of claim 15, further comprising:
program instructions to compute distances between nodes of the graph of the discussion community by summing the edges connecting concept topics of one message to concept topics of another message and includes connections between metadata associated with the respective messages; and
program instructions to compute the boundary distance threshold based on an offset of a measure of central tendency of distances between nodes of the graph.

17. The computer system of claim 15, further comprising:
program instructions to combine or separate concept topics of existing messages, based on the distances between nodes of the graph corresponding to the concept topics of the existing messages; and
program instructions to determine distances between node by assigning a weight to an edge connecting the nodes of the graph corresponding to the concept topics of the existing messages, indicating a strength of relationship between the nodes.

18. The computer system of claim 15, wherein metadata of the messages includes author of the message, viewers of the message, a message identification, a community identification, a timestamp of the message, a sentiment, and one or more social modalities associated with the message.

19. The computer system of claim 15, wherein program instructions to perform the action to anchor the one or more new concept topics of the new message in the discussion community includes program instructions to perform a subsequent action of a hierarchy of actions in response to determining the one or more new concept topics of the new message fails to meet the boundary distance threshold following a previous action.

20. The computer system of claim 15, wherein program instructions to perform the action to anchor the one or more new concept topics of the new message in the discussion community proceeds until all of a hierarchy of actions have been exhausted, thereafter assigning the one or more new concept topics of the new message to a new category.

\* \* \* \* \*